March 29, 1966 R. M. BLOOM 3,243,133

COMPOSITE TAPE REEL

Filed April 2, 1964

INVENTOR.
ROY M. BLOOM

BY
OSTROLENK, FABER, GERB & SOFFEN

ATTORNEYS

United States Patent Office 3,243,133
Patented Mar. 29, 1966

3,243,133
COMPOSITE TAPE REEL
Roy M. Bloom, 13 Harcourt Road, Scarsdale, N.Y.
Filed Apr. 2, 1964, Ser. No. 356,764
2 Claims. (Cl. 242—55.11)

The present invention relates to a tape reel for a dictating machine and more particularly to a composite reel formed integrally with such a machine.

It is among the objects of this invention to provide a composite tape reel which is built into a dictating machine and which facilitates simplified threading of dictating tapes thereon.

A further object of the invention is to provide such a reel which may be readily employed in connection with looped end tape materials.

The nature and objects of the invention will be more fully apparent from a consideration of the following detailed description of a preferred embodiment of the composite tape reel hereof, taken in connection with the accompanying drawing in which.

Figures 1, 2, 3, 4:
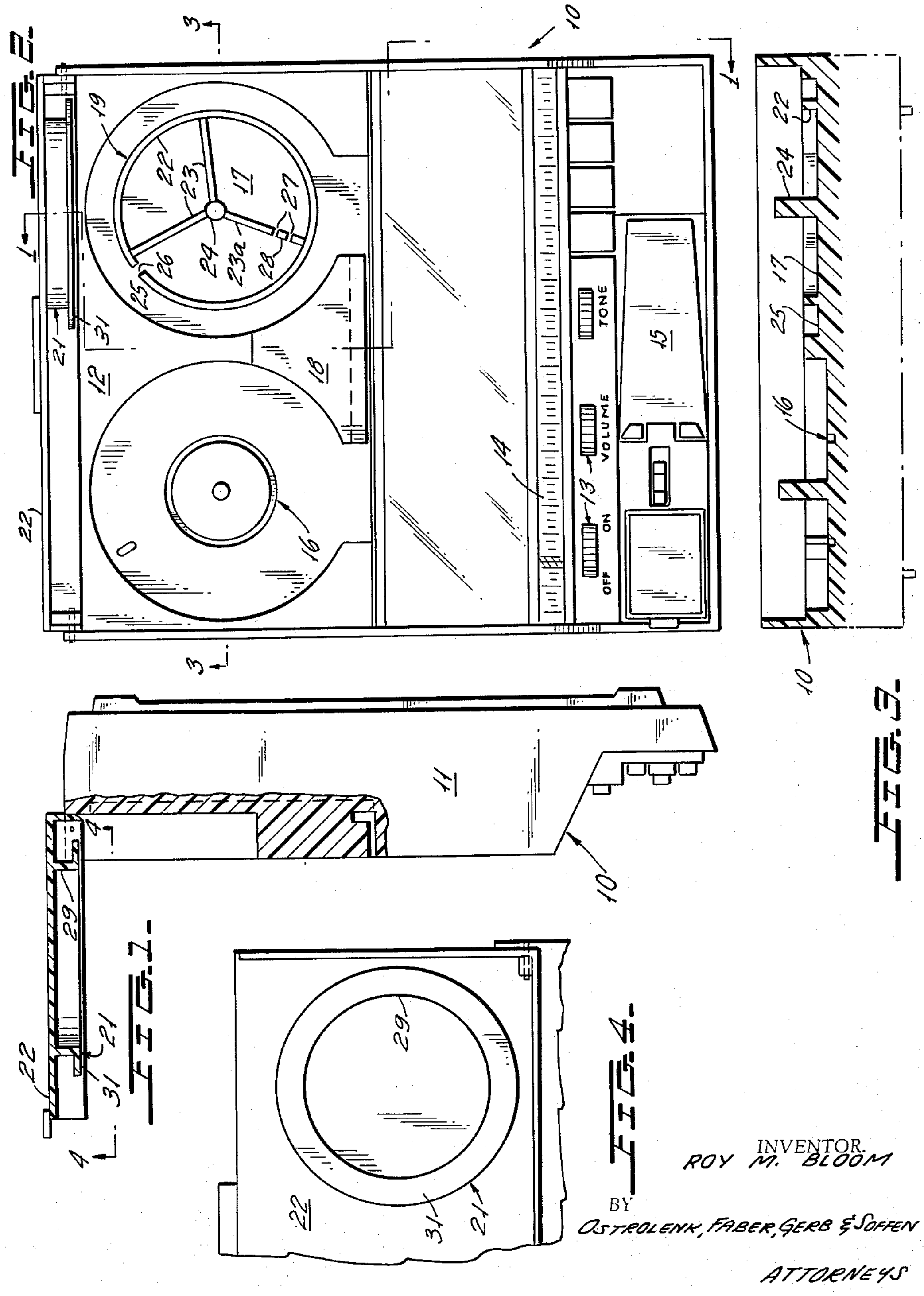
FIGURE 1 is a side elevation of a dictating machine incorporating a preferred form of the composite tape reel, the machine illustrated partially in section and viewed along the line 1—1 in FIGURE 2.
FIGURE 2 is a plan view of the dictating machine shown in FIGURE 1.
FIGURE 3 is a side elevation, partially in section, along the line 3—3 in FIGURE 2.
FIGURE 4 is a detail view taken in the direction of the line 4—4 in FIGURE 1.

In accordance with the invention, a composite tape reel is provided integrally with a dictating machine, the reel comprising a first component mounted adjacent the drive mechanism of the machine and a second component formed integrally with a cover for the machine. The first component includes a cylindrical hub driven by the drive mechanism, a face flange extending annularly of the hub at one end thereof and defining at least a portion of the tape support surface of the machine, and a machine mechanism associated with the hub for engaging an end of a dictating tape and facilitating winding of the tape about the hub. The second component of the composite reel is disposed adjacent the first component, when the cover is mounted on the machine, and when so disposed includes a cylindrical stationary hub positioned adjacent to and in alignment with the driven hub, and a face flange extending annularly of the stationary hub at the end thereof adjacent the driven hub.

Hence, when the cover of the dictating machine is closed, the driven hub and the face flanges of the respective reel components define a composite tape reel for the dictating machine.

Referring to the drawing, a dictating machine 10 is illustrated, including a housing 11, in which a suitable drive and sound transcribing mechanism is mounted, a tape support surface 12, suitable controls 13 and, preferably, a recording gauge 14. A microphone 15 may also, if desired, be mounted in a cradle on the dictating machine, as illustrated in the drawing.

The tape support surface 12 is provided with means for receiving a tape feed reel at 16, and is integral with a composite take-up reel 17 in accordance with the invention, as described more fully hereinafter. As shown in FIGURE 2, the feed and take-up reels are mounted adjacent a recording head 18 so as to facilitate tape feed past the same.

The composite tape reel hereof includes a first component 19 (see FIGURES 2 and 3) and a second component 21 formed integrally with the cover or lid 22 of the dictating machine. The component 19 includes a cylindrical hub 22 supported by a number of spokes 23 emanating from a central shaft 24 connected to the dictating machine drive mechanism. A face flange 25 extends annularly of the hub 22 at its base and defines a portion of the tape support surface 12 of the machine.

A slot 26 is provided longitudinally of the hub 22 and one of the spokes 23 supporting the hub is provided with a further pair of spaced slots 27 defining an intermediate segement 28 upstanding from the tape support surface 12. The segment 28 may be utilized to engage the looped end of a dictating machine tape and the tape threaded through slot 26 and about the periphery of the hub 22, when the composite reel is utilized, as illustrated, as a take-up reel.

The second component 21 of the composite reel includes a further cylindrical hub 29 secured to the lid 22 of the machine and has a ring shaped face flange 31 extending annularly of such hub. When lid 22 is disposed in its closed position, the stationary hub 29 is positioned adjacent the driven hub 22 with the flanges 25 and 31 defining the outer flanges of the component tape reel thus produced.

There is thus provided a built-in composite tape reel which may be readily threaded by engaging a looped end tape to the segment 28 prior to assembling the components of the reel. The composite reel is thus exceedingly simple to thread, as compared with prior tape reels and may be readily utilized to perform its desired function as a tape take-up mechanism.

Since various changes may be made in the embodiment of the component tape reel described without departing from the concept of the present invention, it is intended that all matter contained in the above description or shown in the accompanying drawing shall be interpreted as illustrative and not in a limiting sense.

I claim:

1. A composite tape reel for a dictating machine, said reel being formed integrally with the dictating machine and comprising (a) a first component mounted in contiguity with the drive mechanism of said machine and including
  (1) a first cylindrical hub driven by said drive mechanism,
  (2) a face flange extending annularly of said hub at one end thereof and defining at least a portion of a tape support surface of said machine, and
  (3) means associated with said hub for engaging an end of a tape material and facilitating winding of said tape about said hub; and (b) a second component formed integrally with the cover of said machine, the second component, when said cover is mounted on the machine, being disposed adjacent said first component and including
  (1) a second cylindrical stationary hub disposed adjacent to and in alignment with the first driven hub, and
  (2) a second face flange extending annularly of the second hub at the end thereof adjacent the first driven hub; the first driven hub and the first and second face flanges defining said composite tape reel.

2. The composite tape reel as defined in claim 1, wherein said first driven hub is hollow and includes at least one slot extending longitudinally thereof through which a tape material may pass, and in which said means for engaging the tape material and facilitating winding about said driven hub comprises a plurality of radial spokes supporting the driven hub, at least one of which spokes has a pair of longitudinal slots extending therethrough and spaced such that a looped end tape material will fit annularly of and in engagement with the spoke segment intermediate said slots.

No references cited.

STANLEY N. GILREATH, *Primary Examiner.*

G. F. MAUTZ, *Assistant Examiner.*